United States Patent
Huang

[11] Patent Number: 6,129,052
[45] Date of Patent: Oct. 10, 2000

[54] KNOCK-DOWN BIRD CAGE

[76] Inventor: Candy Huang, 1F, No. 171, Fu-Hua Rd., Shih-Lin Dist., Taipei, Taiwan

[21] Appl. No.: 09/309,547

[22] Filed: May 11, 1999

[51] Int. Cl.⁷ .................................................. A01K 31/08
[52] U.S. Cl. .......................... 119/461; 119/463; 119/474; 119/479; 119/485
[58] Field of Search .................................. 119/461, 452, 119/462, 463, 469, 474, 479, 482, 485; D30/114, 120

[56] References Cited

U.S. PATENT DOCUMENTS

| | | |
|---|---|---|
| 85,523 | 1/1869 | Gunther . |
| 2,783,738 | 3/1957 | Willeko . |
| 4,930,445 | 6/1990 | Chestnut .................................. 119/485 |
| 5,000,121 | 3/1991 | Daily ........................................ 119/461 |
| 5,353,738 | 10/1994 | Chiu ......................................... 119/461 |
| 5,957,086 | 9/1999 | Gallardo .................................. 119/429 |

*Primary Examiner*—Peter M. Poon
*Assistant Examiner*—Yvonne R. Abbott
*Attorney, Agent, or Firm*—Bacon & Thomas, PLLC

[57] ABSTRACT

A knock-down bird cage, which includes a cage body and a stand supporting the cage body, wherein the cage body is formed of a right side panel, a left side panel, a front panel, a rear panel, a right top panel, a left top panel, a horizontal bottom panel, and a collector plate spaced below the horizontal bottom panel and defining with a respective bumper board at each of the right side panel, left side panel, front panel and rear panel a receptacle for collecting waste matter; the stand include a plurality of legs, the legs each a top mounting frame, and a plurality of clamping plates respectively fastened to the top mounting frame at each of the legs to secure the legs to the receptacle of the cage body at a bottom side.

5 Claims, 6 Drawing Sheets

KNOCK-DOWN BIRD CAGE

BACKGROUND OF THE INVENTION

The present invention relates to a bird cage, and more particularly to a knock-down bird cage that can be collapsed and packed in a collapsed manner to reduce its transportation cost.

After busy duty-hours or during holidays, people may participate different activities such as enjoying music, cultivating garden plants and flowers, raising birds, etc. For raising birds, a bird cage is needed. A variety of bird cages are commercially available. However, these bird cages are commonly not collapsible. FIG. 1 shows a knock-down bird cage which can be arranged into a collapsed manner to minimize its transportation cost. This structure of knock-down bird cage is comprised of a cage body, a collector plate, and a stand. The cage body is collapsible, and comprised of a set of panels detachably coupled to one another. However, because the collector plate and the stand are not collapsible, the knock-down bird cage still occupies much storage space when collapsed.

SUMMARY OF THE INVENTION

According to one aspect of the present invention, the knock-down bird cage is comprised of a collapsible cage body, a collector plate detachably coupled to the collapsible cage body, and a stand, which supports the cage body. According to another aspect of the present invention, the stand is comprised of a plurality of legs respectively detachably fastened to the collator plate at the bottom side of the collapsible cage body.

DETAILED DESCRIPTION OF THE PREFERRED

Figure 1:
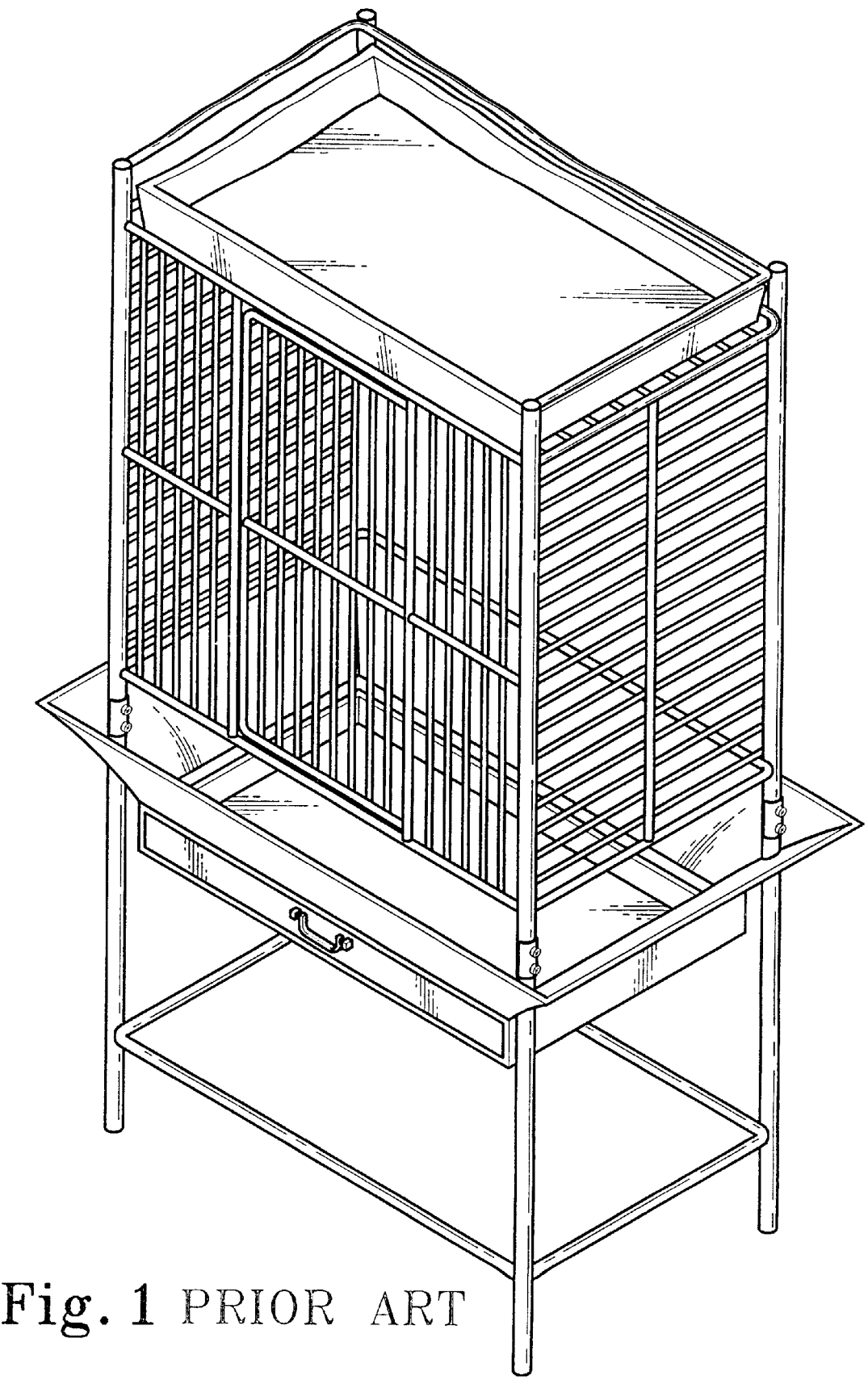
FIG. 1 is a perspective view of a bird cage according to the prior art.
Figure 2:
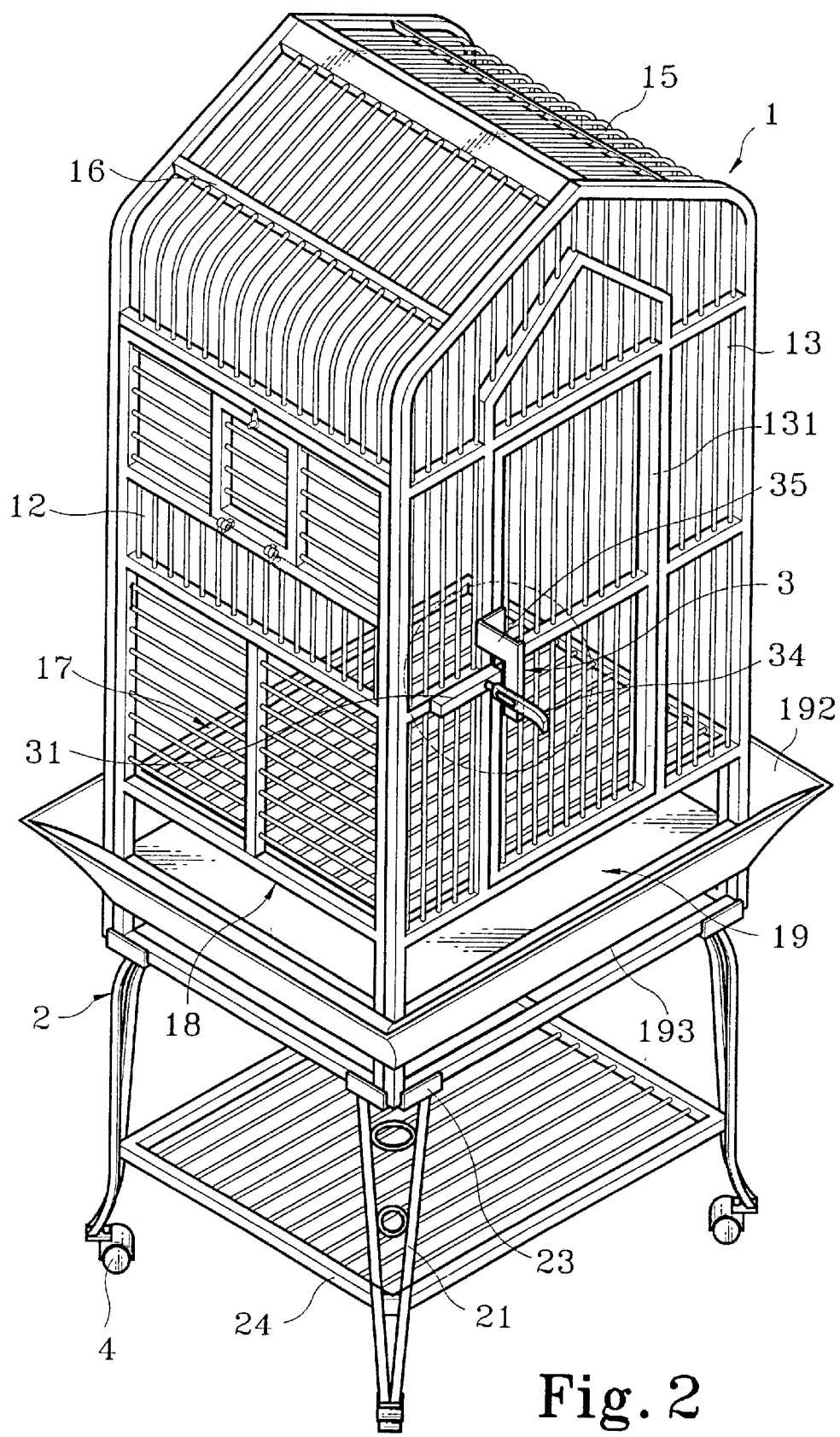
FIG. 2 is a perspective view of a bird cage according to the present invention.
Figure 3:
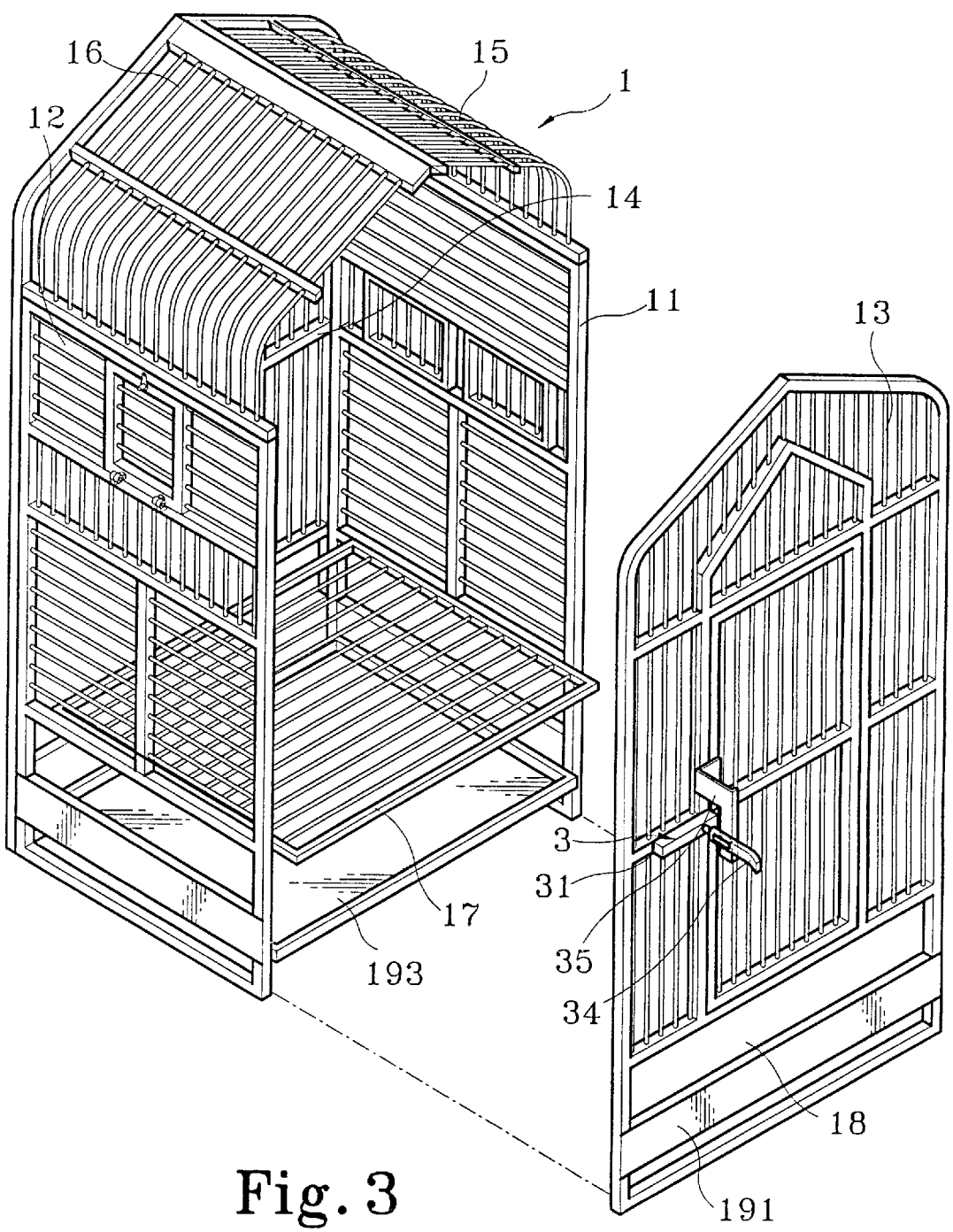
FIG. 3 is an exploded view of the cage body of the bird cage according to the present invention.

Referring to FIGS. 2 and 3, a knock-down bird cage is shown comprised of a stand 2, and a cage body 1 supported on the stand 2.

The cage body 1 is comprised of a right side panel 11, a left side panel 12, a front panel 13, a rear panel 14, a right top panel 15, a left top panel 16, and a bottom panel 17. The panels 11~17 are respectively made by welding wrought iron bars into shape, and connected to one another (by screw means, snap means, or any suitable coupling means). The right side panel 11, left side panel 12, front panel 13, and rear panel 14 each comprise a bumper board 191 near the bottom side, and an opening 18 above the bumper board 191. During the assembly process of the cage body 1, a collector plate 193 is fastened to the right side panel 11, the left side panel 12. the front panel 13, and the rear panel 14 at the bottom. After installation, the collector plate 193 define with the bumper boards 191 at the right side panel 11, left side panel 12, front panel 13 and rear panel 14 a receptacle 19 for collecting waste matter. Furthermore, oblique guide boards 192 are respectively connected to the bumper boards 191 at the top, and abutted one against another. The oblique guide boards 192 form an outwardly upwardly extended peripheral wall surrounding the opening 18 at each of the right side panel 11, left side panel 12, front panel 13 and rear panel 14. The peripheral wall of the oblique guide boards 192 stop fallen feathers of the birds or feed from falling out of the cage body 1.

Figure 4:
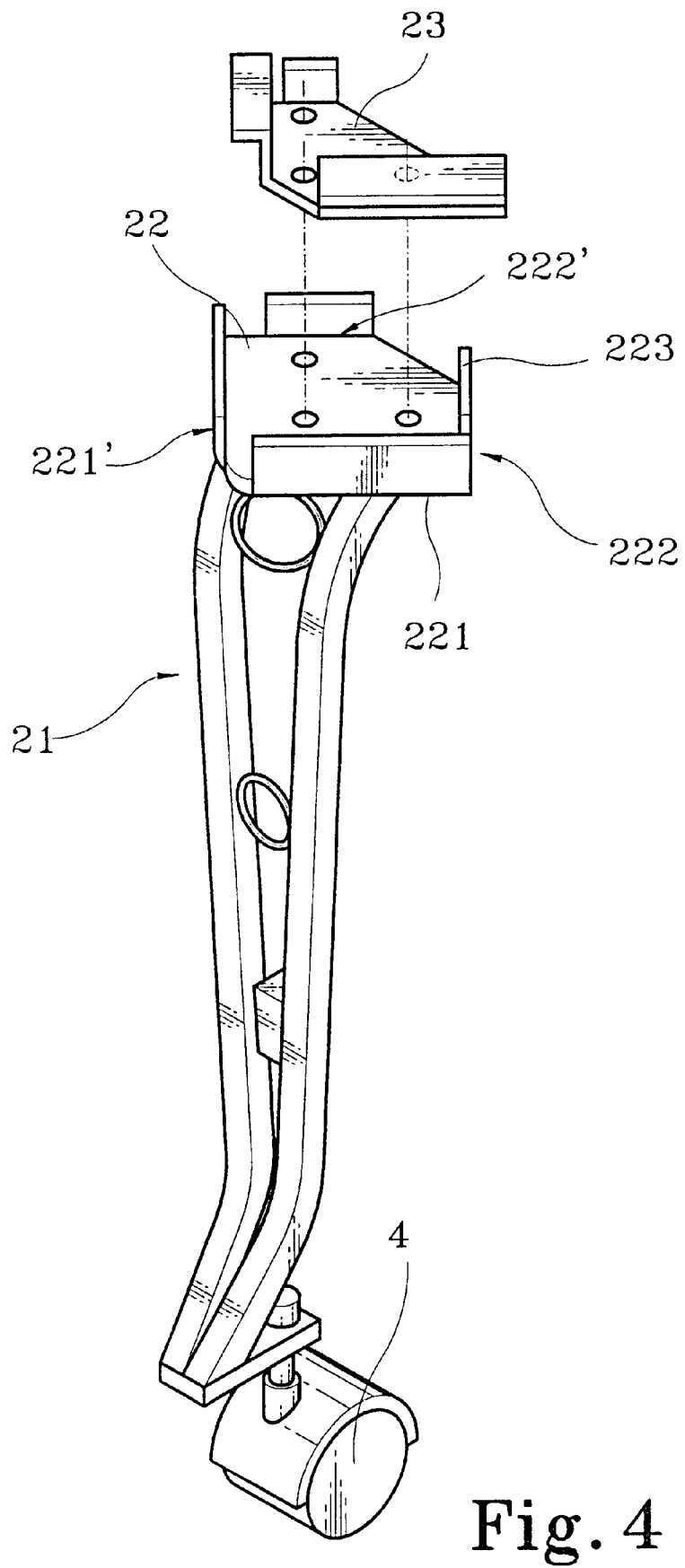
FIG. 4 is an exploded view of a leg and a clamping plate for the stand for the bird cage according to the present invention.

Referring to FIG. 4 and FIG. 2 again, the stand 2 comprises a plurality of legs 21. The legs 21 each comprise a top mounting frame 22. The top mounting frame 22 comprises two long sides 221 and 221' arranged at right angles, two short sides 222 and 222' respectively connected to the long sides 221 and 221', and a plurality of vertical side walls 223 respectively perpendicularly raised from the long sides 221 and 221' and the short sides 222 and 222'. By attaching the mounting frame 22 of each of the legs 21 to the receptacle 19 of the cage body 1 at the bottom and fastening a respective clamping plate 23 to the mounting frame 22 of each of the legs 21, the cage body 1 and the legs 21 are fastened together.

Referring to FIGS. 2 and 4 again, the legs 21 each are equipped with a wheel 4 to make the bird cage easy to move. A rack 24 fastened to the legs 21 of the stand 2, and spaced below the receptacle 19 at a distance for holding, for example, a potted plant.

Figure 5:
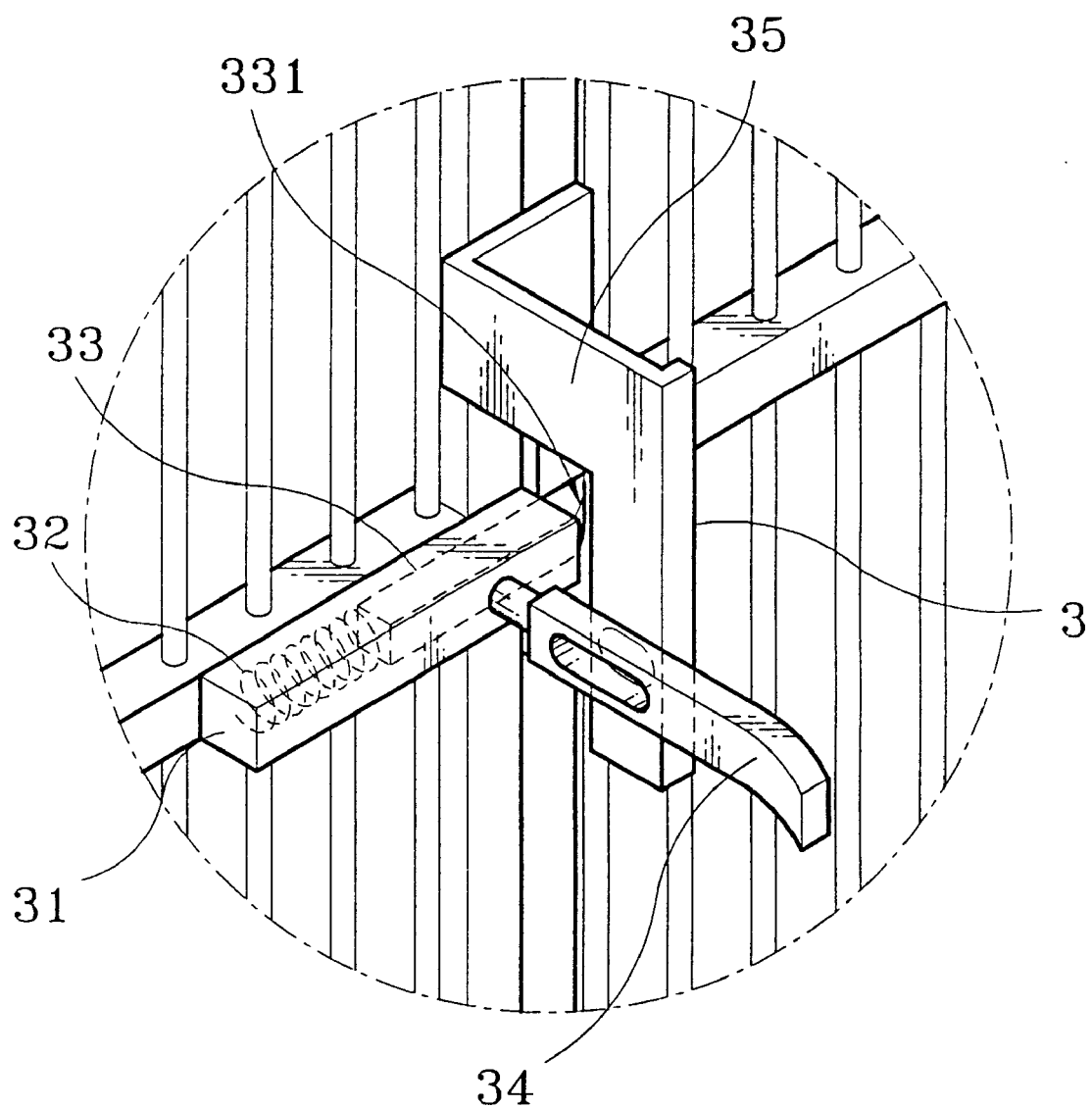
FIG. 5 is a perspective view in an enlarged scale of a part of the present invention, showing the hinged door panel locked.

Referring to FIG. 5 and FIGS. 2 and 3 again, the front panel 13 of the cage body 1 comprises a hinged door panel 131, and a lock 3 for locking the hinged door panel 131 in the closed position. The lock 3 comprises a casing 31 fixedly mounted on the front panel 13 outside the hinged door panel 131, a compression spring 32 mounted inside the casing 31, a latch bolt 33 slidably mounted in the casing 31 and supported on the compression spring 32. a handle 34 fixedly connected to the latch bolt 33 and disposed outside the casing 31, and a strike plate 35 fixedly mounted on the hinged door panel 131 for receiving the latch bolt 33. The latch bolt 33 has a beveled front edge 331. When closing the hinged door panel 131, the hinged door panel 131 is pressed against the beveled front edge 331 to force the latch bolt 33 backwards against the compression spring 32 for enabling the hinged door panel 131 to pass. After the hinged door panel 131 has been moved to the close position, the latch bolt 33 is forced forwards by the compression spring 32 into engagement with the strike plate 35, and therefore the hinged door panel 131 is locked in the close position. Further, a locking device may be provided to lock the handle 34 and the strike plate 35 together.

As indicated above, the bird cage is a knock-down structure. The parts of the bird cage can be detached from one another, and then packed together to minimize transportation cost.

Figure 6:
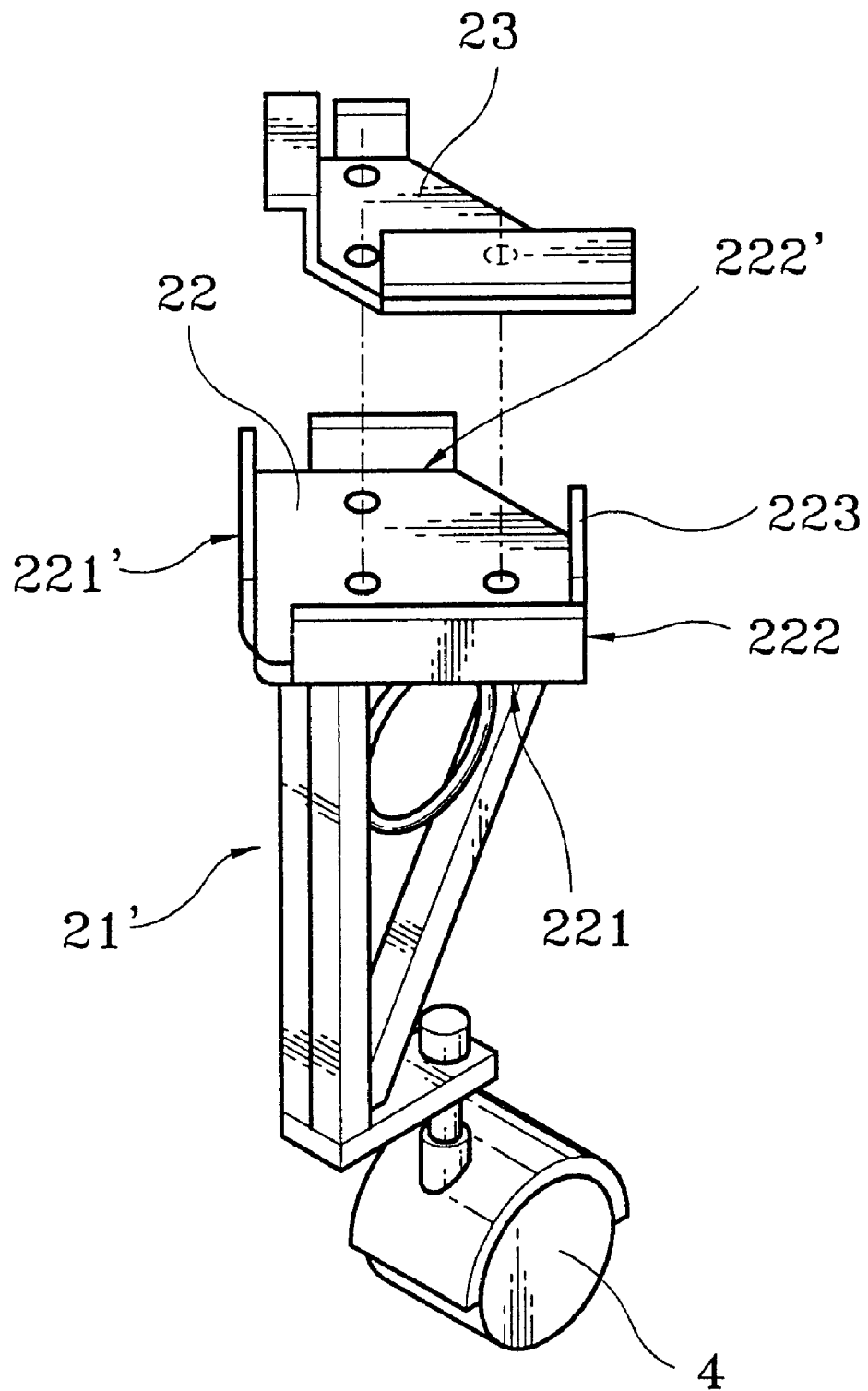
FIG. 6 is an exploded view of a leg and a clamping plate for an alternate form of the stand for the bird cage according to the present invention.

It is to be understood that the drawings are designed for purposes of illustration only, and are not intended for use as a definition of the limits and scope of the invention disclosed. For example, the leg 21' shown in FIG. 6 may be used for the stand 2 instead of the leg 21 shown in FIG. 4.

What is claimed is:

1. A knock-down bird cage comprising:
   a cage body, said cage body comprising a right side panel, a left side panel, a front panel, a rear panel, a right top panel, a left top panel, a horizontal bottom panel, said right side panel, said left side panel, said front panel and said rear panel each comprising a bumper board, and an opening disposed at an elevation between said bumper board and said horizontal bottom panel, a collector plate fastened to said right side panel, said left side panel, said front panel and said rear panel and defining with the bumper boards at said right side panel, said left side panel, said front panel and said rear panel a receptacle for collecting waste matter; and a stand fastened to said cage body to support said cage body on a flat surface, said stand comprising a plurality of legs, said legs each comprising a top mounting frame, and a plurality of clamping plates respectively fastened to the top mounting frame at each of said legs to secure said legs to the receptacle of said cage body at a bottom side, said top mounting frame comprising two long sides arranged at right angles, two short sides respectively connected to said long sides, and a plurality of vertical side walls respectively perpendicularly raised from said long sides and said short sides.

2. The knock-down bird cage of claim 1 further comprising a rack fastened to the legs of said stand, and spaced below said collector plate.

3. The knock-down bird cage of claim 1 wherein the legs of said stand each are equipped with a wheel.

4. The knock-down bird cage of claim 1 wherein said front panel of said cage body comprises a hinged door panel, and a lock for locking said hinged door panel.

5. The knock-down bird cage of claim 4 wherein said lock comprises a casing fixedly mounted on said front panel outside said hinged door panel, a spring member mounted inside said casing, a latch bolt mounted in said casing and supported on said spring member and pushed out of said casing by the spring force of said spring member, said latch bolt having a beveled front edge disposed outside said casing, a handle fixedly connected to said latch bolt outside said casing for operation by hand to move said latch bolt backwards against said spring member, and a strike plate fixedly mounted on said hinged door panel for receiving said latch bolt.

* * * * *